United States Patent Office 3,115,102
Patented Dec. 24, 1963

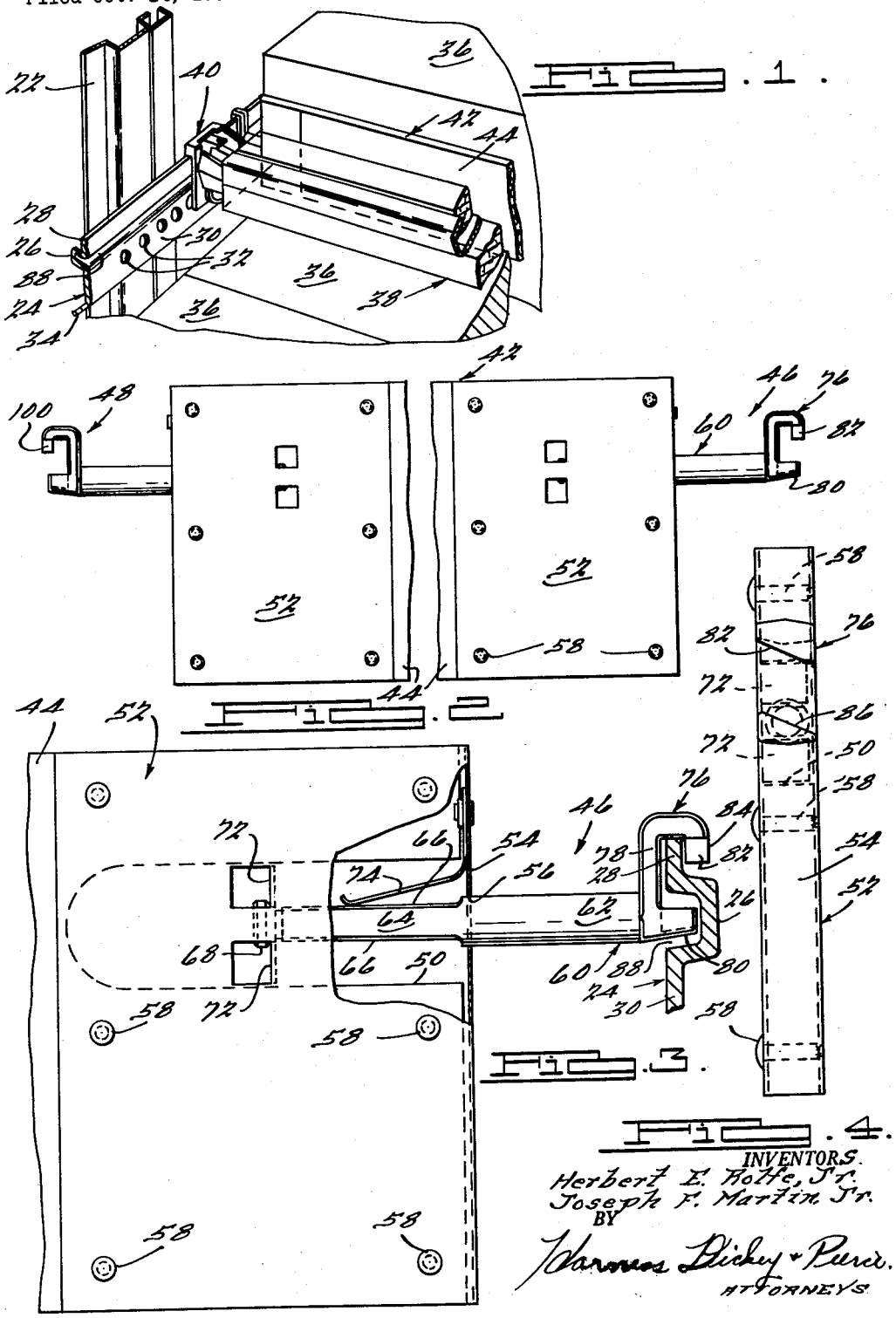

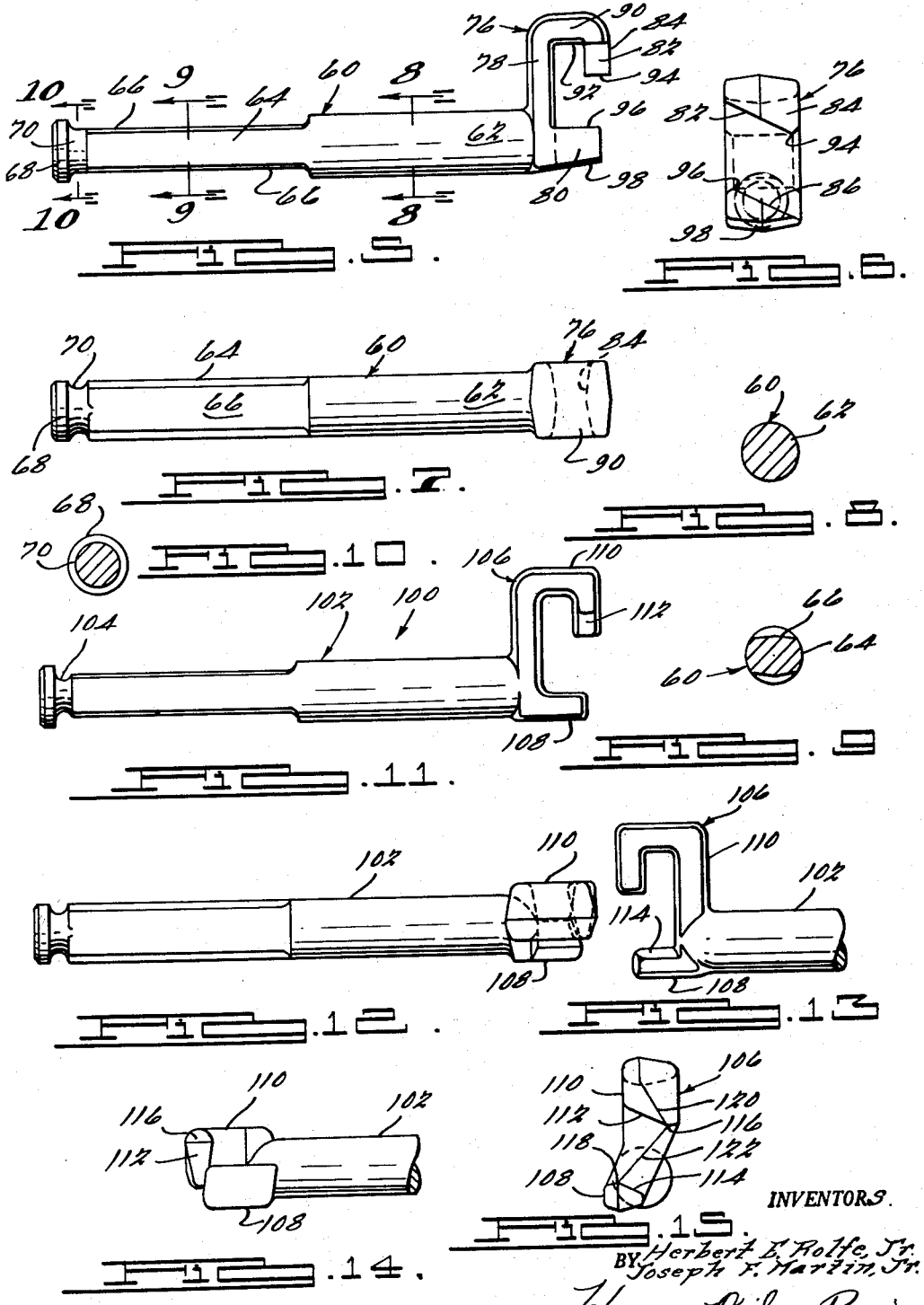

3,115,102
FREIGHT BRACING EQUIPMENT
Herbert E. Rolfe, Jr., Garden City, and Joseph F. Martin, Jr., Dearborn, Mich., assignors to Evans Products Company, Plymouth, Mich., a corporation of Delaware
Filed Oct. 14, 1959, Ser. No. 846,478
19 Claims. (Cl. 105—369)

The present invention relates to freight bracing apparatus and more particularly, to an improved freight bracing element known in the trade as a swingboard.

The freight bracing apparatus to which the present invention relates may be used in any freight storing chamber and is particularly adapted for use in portable chambers such, for example, as provided by trucks and railway freight cars in which the freight must be secured in place so as to resist the shock loads incident to starting and stopping and severe bumping encountered in the making up of trains in the freight yards. In such a freight bracing apparatus marketed by the assignee of the present application under its trademark "DF," the freight is held in place by crossbars including an elongated bar body having end fittings at opposite ends thereof which may be selectively secured at desired points to belt rails secured to the side walls of the boxcar. These crossbars may be, for example, four inches square in cross section. In the case of some loads, and this may be the case, for example, in connection with certain loads loaded in cardboard cartons, it is desired to have a larger area contact with the load than is afforded by one side of the crossbar. It is in such instances that what is known as a swingboard is employed between the crossbar and the load. The present invention relates to an improved swingboard and more particularly, to an improved swingboard end fitting construction.

It is an object of the present invention to provide an improved swingboard which is simple in design, economical of manufacture, durable in construction and reliable and efficient in operation.

More particularly, it is an object of the present invention to provide an improved swingboard construction having an improved end fitting adapted for connection to an associated belt rail for free movement longitudinally thereof, but which is held against movement transversely of the belt rail.

A further object of the present invention is to provide such a swingboard end fitting particularly adapted for use with, and connection to, a belt rail of the type disclosed in the copending application Serial No. 836,168 filed August 26, 1959, now Patent No. 3,071,086, in the name of Henry L. Dunlap and assigned to the assignee of the present application.

Another object of the present invention is to provide such a swingboard end fitting which has no moving parts, thus providing a simplified construction which eliminates the possibility of loss of parts and minimizes repair problems.

It is also an object of the present invention to provide such an improved end fitting which may be forged in finished form, eliminating the need for subsequent machining operations.

Another object of the present invention is to provide an improved swingboard construction having an improved end fitting adapted to provide what is known in the trade as pitch splitting. As applied to swingboards, this term refers to the possibility of positioning the swingboard at two different elevations, in each of which the end fittings are connected to the same belt rails at the same points on these belt rails.

More specifically, it is an object of this invention to provide improved means connecting the end fitting to the swingboard permitting relative rotation between the swingboard and the end fitting for effecting pitch splitting and including means for preventing such relative rotation from taking place inadvertently.

Other and more detailed objects of the present invention will be appreciated by those skilled in the art from a consideration of the following specification, the appended claims and the accompanying drawings wherein:

FIGURE 1 is a broken perspective view showing freight bracing apparatus embodying the present invention;

FIGURE 2 is a broken elevational view of a swingboard embodying the present invention;

FIGURE 3 is a broken enlarged view of the right-hand end portion of the swingboard illustrated in FIGURE 2;

FIGURE 4 is an end elevational view of the construction illustrated in FIGURE 3;

FIGURE 5 is an elevational view of the end fitting illustrated in FIGURE 3;

FIGURE 6 is an end elevational view of the end fitting illustrated in FIGURE 5;

FIGURE 7 is a plan view of the end fitting illustrated in FIGURE 5;

FIGURES 8, 9 and 10 are sectional views of the end fitting illustrated in FIGURE 5, taken susbtantially along the lines 8—8, 9—9 and 10—10 thereof, respectively;

FIGURE 11 is an elevational view of an end fitting constructed according to a modified form of the invention;

FIGURE 12 is a plan view of the end fitting illustrated in FIGURE 11;

FIGURE 13 is a broken elevational view of the rear of the end fitting as seen in FIGURE 11;

FIGURE 14 is a broken view of the bottom of the end fitting as seen in FIGURE 13; and, FIGURE 15 is an end elevational view of the end fitting of FIGURE 11 as viewed from the right-hand end thereof.

While the improved swingboard of the present invention is herein illustrated and described in connection with a belt rail of the type illustrated in the above mentioned application of our co-worker Henry L. Dunlap, it will be readily appreciated by those skilled in the art that the improvements thereof may be readily embodied in swingboards of widely differing types and adapted for connection to numerous other belt rail constructions.

Referring to the drawings, and particularly to FIGURES 1 through 10 thereof, a boxcar side wall frame member is indicated at 22 and carries a belt rail 24 which, in the preferred embodiment illustrated, is of the same construction as the belt rail illustrated and described in detail in the above mentioned copending application of Henry L. Dunlap. As illustrated in FIGURE 1 (and on a larger scale in FIGURE 3) the belt rail 24 includes a channel-shaped portion 26, the web of which may be welded or otherwise suitably secured to the wall members 22. The upper leg of the channel-shaped portion 26 carries a supporting flange 28 extending upwardly therefrom in spaced parallel relation to the side wall. The lower leg of the channel-shaped portion 26 connects to a downwardly extending flange 30 having a plurality of apertures 32 spaced therealong and having a leg 34 engaging the side wall member 22 to support its lower portion. FIGURE 1 shows a load of cardboard cartons 36, one of which is braced against longitudinal movement in one direction by a crossbar 38 connected to the belt rail 24 by an end fitting 40, the crossbar 38 and end fitting 40 both being constructed as illustrated and described in the above mentioned application of Henry L. Dunlap.

Between the load 36 and the crossbar 38, to provide an increased area of contact with the load 36, is a swingboard 42 constructed according to the present invention.

The swingboard 42 generally comprises an elongated flat body portion 44 formed of wood or other suitable material and carrying end fittings 46 and 48 at opposite ends thereof for connection to the belt rails 24. The body portion 44 has a slot 50 in each end thereof extending longitudinally of the body portion and has a sheet metal channel 52 at each end. The web 54 of the channel 52 overlies the end edge of the body portion 44 and has a circular aperture 56 aligned with the slot 50. The legs of the channel 52 provide protective face plates overlying the opposite sides of the end portions of swingboard body portion 44 and covering the opposite sides of the slot 50. Each channel 52 is securely held in place by a plurality of rivets 58 extending through the body portion 44 and one side of the channel 52 and resistance welded to the other side of the channel 52.

The end fittings 46 and 48 differ only in that one is right-hand and the other is left-hand and only one of these end fittings and its mounting in the swingboard 42, need be described. Referring to FIGURE 3, the end fitting is provided with a shank 60 by which it is connected to the swingboard. The shank includes an outer portion 62 of circular cross section, as illustrated in FIGURE 8, which extends through the circular aperture 56, and an intermediate portion 64 having a pair of generally flat sides 66 at opposite sides thereof. At the inner end of the shank 60 is a stop portion 68 which is circular and of the same diameter as the outer portion 62. This stop portion 68 is connected to the intermediate portion 64 by a short circular portion 70 of a diameter equal to the distance between the flats 66 of the intermediate portion 64. The shank 60 is supported by the web portion 54 of the sheet metal channel 52 around the periphery of the aperture 56 through which the outer shank portion 62 extends, and is supported in spaced relation inwardly thereof by a pair of supporting tabs 72 turned inwardly from one side of the sheet metal channel 52 into the slot 50, as best illustrated in FIGURE 3. The spacing between the adjacent edges of the tabs 72 is substantially equal to the diameter of the shank portion 70 and the distance between the flats 66 of the intermediate portion 64. The channel 52 also carries a flat spring 74, one end of which is secured to the web 54 of the channel 52. The spring 74 extends inwardly of the slot 50 and its inner end portion engages the intermediate shank portion 66.

It will now be seen that when the end fitting 46 is in the fully extended position illustrated in FIGURE 3, the stop portion 68 engages the tabs 72 to prevent further outward movement of the end fitting. It will also be noted that in this position the small circular shank portion 70 is disposed between the tabs 72 permitting the end fitting 46 to be rotated relative to the swingboard. Such rotation is yieldably resisted by the spring 74 which engages the flats 66 to hold the end fitting in either the position illustrated in FIG. 3, or a position 180° therefrom. When the end fitting 46 is in either of these positions it may be moved inwardly against the frictional resistance to such movement provided by the spring 74. Such movement moves the flats 66 between the tabs 72 so that the end fitting is positively held by the tabs 72 in the selected rotative position relative to the swingboard until the end fitting is again fully extended to move the circular shank portion 70 between the tabs 72.

At the outer end of the outer portion 62 of the shank 60 is an end fitting head 76 adapted to be connected to the belt rail 24 for free movement longitudinally thereof. The head 76 is integral with the shank 60 and in the embodiment illustrated in FIGURES 1 to 10, inclusive, the end fitting is forged. The head 76 is generally C-shaped with the open side of the C away from the shank 60 which connects to the head 76 at the lower portion of the solid side of the C. The head 76 may also be considered as consisting of a hook-shaped portion 78 extending upwardly and outwardly from the outer end of the shank 60 and a projection or prong 80 extending longitudinally of the shank 60 beyond its outer end below and in the plane of the hook-shaped portion 78. In this construction the same forging is used for both end fittings 46 and 48, the end fitting 46 being formed therefrom by machining the head 76 at the open side of the C to provide the inclined surface 82 on the downwardly turned end portion 84 of the hook-shaped upper portion 78 of the head 76 and to provide on the prong 80 forming the lower part of the C-shaped head, a similarly inclined surface 86 (see FIG. 6) disposed in spaced parallel relation to the surface 82. In the preferred embodiment illustrated the spaced parallel inclined surfaces 82 and 86 are disposed at an angle of approximately 65° to the plane of the C-shaped head 76. The distance between these surfaces, measured normal thereto, of course, is sufficient to receive the supporting flange 28 of the belt rail 24 therebetween when the end fitting is disposed with surfaces 82 and 86 parallel to the belt rail 24. As the end fitting is moved relative to the belt rail so that the supporting flange 28 moves between the surfaces 82 and 86 of the end fitting head 76, the prong 80 on which the surface 86 is formed moves into the groove 88 (best shown in FIG. 20) defined by the channel portion 26 of the belt rail 24. Preparatory to this just mentioned movement, and to dispose the surfaces 82 and 86 parallel to the belt rail 24, the swingboard 42 and the end fittings 46 and 48 carried thereby are rotated in a counterclockwise direction as viewed in FIGURE 4, and then after the above described movement in which the surfaces 82 and 86 pass over and under, respectively, the belt rail supporting flange 28, the connection of the end fittings to the belt rails is completed by rotating the swingboard and end fittings in the opposite or clockwise direction as viewed in FIGURE 4. This later movement moves the downwardly extending portion 84 of the hook-shaped portion 78 of the end fitting head behind the support flange 28, that is, into the space between the support flange 28 and the adjacent side wall. The hook-shaped portion 78 has a horizontal section 90, see FIGURE 5, the lower or inner surface 92 of which rests upon the upper edge of the supporting flange 28 for free sliding movement therealong after the connection of the end fitting to the belt rail by the above described movements.

The distance measured in the plane of the C-shaped head 76 between the lowest point 94 of the surface 82 and the highest point 96 of the surface 86 is less than the distance from the top of the belt rail groove 88 to the top of the supporting flange 28 so that even though the swingboard is raised to lift the support surface 92 of the hook-shaped portion 78 off of the upper edge of the support flange 28 and until the prong 80 engages the belt rail 24 at the top of the groove 88, the end fitting head cannot be withdrawn from the belt rail so long as the head 76 is disposed perpendicular to the length of the belt rail. It will, of course, be apparent from FIGURE 1 that, in use, the swingboard will be held so disposed by the load 36 at one side and the cross-bar 38 at the opposite side. The swingboard 42, through the supporting tabs 72 of its channels 52 and their engagement with the shank flats 66 will in turn hold the end fittings disposed with the plane of their C-shaped heads perpendicular to the length of the belt rails. When the end fitting is connected to the belt rail, in addition to being supported on the supporting surface 92 thereof for free movement longitudinally of the belt rail, is held against pulling away from the belt rail by the downwardly projecting portion 84 disposed behind the belt rail supporting flange 28 and is held against excessive upward movement by the prong 80 which is disposed within the belt rail groove 88. The upward slope on the lower surface of the prong 80 indicated at 98, see FIGURE 5, provides clearance to avoid interference between the bottom of the prong 80 and the belt rail 24 at the bottom of the groove 88 when the end fitting head supporting surface 92 engages the upper edge of the belt rail supporting flange 28.

The end fitting 48 differs from the end fitting 46 only in that the surfaces thereof corresponding to the surfaces 82 and 86 of the end fitting 46 are oppositely sloped, the surface 100 thereof corresponding to the surface 82 being shown in FIGURE 2. Pitch splitting is possible with the above described construction because the slot 50 and the connection of the end fitting to the swingboard is offset from the midpoint of the swingboard. As viewed in FIGURES 2, 3 and 4, the disposition of the end fitting above the center of the swingboard is clear. This, combined with the above described means permitting relative rotation between the swingboard and its end fittings permits pitch splitting. The amount of change of position of the swingboard possible by pitch splitting is controlled by the amount of offset of the shank relative to the midpoint of the swingboard.

FIGURES 11 to 15, inclusive, show another end fitting 100 construction embodying the present invention which is an improvement over the end fittings above described in that the finished or completed end fitting may be forged without requiring any subsequent machining operations. It will be appreciated, of course, that separate forgings are used for the end fittings at the opposite ends of the swingboard, only one of the forgings being illustrated in FIGURES 11 to 15. The end fitting has a shank 102 which differs from the shank 60 above described only in that circular shank portion 104 disposed between the tabs 72 when the end fitting is fully extended is slightly smaller than the above described section 70. The end fitting 100 has a head 106 which differs from the head 76 of the end fitting 46 in that the prong 108 thereof is disposed in offset relation to the hook-shaped portion 110 as is illustrated in FIGURES 12, 14 and 15, the prong 108 and the portion 110 being offset in opposite directions from the axis of the shank 102. To enable the forming of the finished end fitting by forging without subsequent machining, it was found necessary to thus offset the prong relative to the hook-shaped portion to maintain the necessary distance between the surfaces 112 and 114, corresponding to the surfaces 82 and 86, to maintain the desired angle between these surfaces and the plane of the hook-shaped portion 110, and to maintain the necessary distance measured in the plane of the hook-shaped portion 110 between the points 116 and 118, which correspond to the points 94 and 96. The lines 120 and 122 in FIGURE 15 represent the parting line of the forging dies. It is important that the overall width of the end fitting head be no greater than the thickness of the channel of the swingboard. It will be seen in FIGURE 4 that this is true of the construction there illustrated. In the construction of FIGURES 11 to 15, inclusive, this requires that the distance, as viewed in FIGURE 12, from the upper side of the hook-shaped portion 110 to the bottom side of the prong 108 be no greater than the thickness of the swingboard 42 and its covering channel 52. This requires that in this second embodiment of FIGURES 11 to 15, the thickness of the hook-shaped portion 110, as viewed, for example, in FIGURE 13 be less than that of the hook-shaped portion 78 of the first described embodiment because of the offset of the prong 108 relative to the hook-shaped portion 110.

While only two specific embodiments of the invention have been illustrated and described in detail, it will be readily appreciated by those skilled in the art that numerous modifications and changes may be made without departing from the spirit of the present invention.

What is claimed is:

1. In a freight bracing apparatus for a railroad freight car or the like having supporting rails mounted on opposite side walls of said car and a swingboard supported on and extending between a pair of said support rails on opposite side walls of said car, each of said support rails having means for supporting one end of a swingboard for free movement longitudinally thereof and against movement transversely thereof, a swingboard end fitting adapted to be connected to one of said rails and having means adapted to co-operate with said means for connecting said end fitting to said swingboard and including means on said end fitting effective when said end fitting is in a first position relative to one of said support rails to connect said end fitting to said one of said rails for free movement longitudinally thereof while positively limiting all movement transversely thereof, said swingboard end fitting including means effective when in a second position relative to said one of said rails to define a slot parallel to said one of said rails and aligned with a portion thereof including said first named means so that said end fitting may be moved transversely of said one of said rails to move said portion thereof into and out of said slot in connecting said end fitting to and disconnecting it from said one of said rails.

2. The invention as defined in claim 1 wherein said second position is rotatively spaced from said first position.

3. In a freight bracing apparatus for a railroad freight car or the like having supporting rails mounted on opposite side walls of said freight car at corresponding elevations and each including an upwardly extending supporting flange disposed in spaced relation to the adjacent side wall and having an upwardly facing support surface and an abutment surface facing but spaced from said adjacent side wall, each said support rail also having a downwardly facing surface disposed in spaced parallel relation below said support surface, a swingboard adapted to extend between and be supported on said support rails, said swingboard including an end fitting at each end of said swingboard, means connecting at least one of said end fittings to said swingboard for movement longitudinally thereof, and means on each of said end fittings effective in one position of the end fitting to connect the end fitting to one of said supporting rails and engage said supporting flange for free movement longitudinally of said rail while limiting all movement of said end fitting transversely of said supporting rail, said last named means being effective in another position of the end fitting relative to said supporting rail to define a slot aligned with and adapted to receive said supporting flange so that said end fitting may be moved transversely of said support rail to move said supporting flange into and out of said slot in connecting said end fitting to and disconnecting it from said belt rail.

4. The invention as defined in claim 3 wherein said swingboard includes a swingboard body and including means for connecting said end fittings to said swingboard body in two positions relative to said swingboard body rotatively spaced through an angle of 180°.

5. In a freight bracing apparatus for a railroad freight car or the like having supporting rails mounted on opposite side walls of said freight car at corresponding elevations and each including an upwardly extending supporting flange disposed in spaced relation to the adjacent side wall and having an upwardly facing support surface and an abutment surface facing but spaced from said adjacent side wall, each said support rail also having a downwardly facing surface disposed in spaced parallel relation below said support surface, a swingboard adapted to extend between and be supported on said support rails, an end fitting at each end of said swingboard adapted to be connected to one of said rails, means connecting at least one of said end fittings to said swingboard for movement longitudinally thereof, means on each of said end fittings defining a fixed end fitting support surface adapted in one position of said end fitting relative to said supporting rail to engage said support surface of said supporting rail flange to support said end fitting on said rail for sliding movement longitudinally thereof, means on each of said end fittings defining a fixed end fitting abutment surface adapted when said end fitting is in said one position relative to said supporting rail to engage said abutment surface of said rail to limit movement of said end fitting in a direction away from said side wall and adapted when said end fitting is rotated relative to said rail from said one position to a second position to move past said abutment surface of said rail without interference therewith during movement of said end fitting away from said side wall, means on each of said end fittings defining a fixed abutment adapted when said end fitting is in said one rotative position relative to said side wall and connected to said belt rail to engage said belt rail to prevent movement of said end fitting normal to said support surface of said rail to a position in which said end fitting abutment surface may move past said abutment surface of said rail upon movement of said end fitting in a direction away from said side wall.

6. The combination defined in claim 5 including co-operating means on each of said end fittings and on said swingboard mounting said end fittings on said swingboard in similar offset relation to a longitudinal axis of said swingboard midway between the top and bottom thereof and for rotation relative thereto between two positions spaced 180° apart.

7. In a freight bracing apparatus for a railroad freight car or the like having supporting rails mounted on opposite side walls of said freight car at corresponding elevations and each including an upwardly extending supporting flange disposed in spaced relation to the adjacent side wall and having an upwardly facing support surface and an abutment surface facing but spaced from said adjacent side wall, each said support rail also having a downwardly facing surface disposed in spaced parallel relation below said support surface, a swingboard adapted to extend between and be supported on said support rails, an end fitting at each end of and carried by said swingboard, means connecting at least one of said end fittings to said swingboard for movement longitudinally thereof, each of said end fittings including a hook-shaped portion adapted to be hooked over said supporting flange and including an end fitting supporting surface adapted to then engage said support surface thereof to support said end fitting on said rail and an end fitting abutment surface adapted to then engage said abutment surface of said flange to limit movement of said end fitting in a direction away from said side wall, each of said end fittings also including a projection adapted, when said hook-shaped portion is hooked over said flange to engage said downwardly facing surface to prevent movement of said end fitting normal to said flange support surface to unhook said hook-shaped portion from said flange, said hook-shaped portion and said projection co-operating to define a slot therebetween inclined relative to said end fitting supporting surface and adapted in one rotative position of said end fitting relative to said rail to receive said flange to permit hooking of said hook-shaped portion over said flange.

8. The combination as defined in claim 7 including co-operating means on said end fittings and on said swingboard mounting said end fittings in coaxial relation to one another and in offset relation to the longitudinal axis at the midpoint of said swingboard and for rotary movement relative thereto between two positions spaced 180° apart.

9. The combination defined in claim 8 including means for yieldably holding each of said end fittings in each of said two positions.

10. The combination defined in claim 8 wherein said co-operating means includes a shank on said end fitting and means on said swingboard rotatably supporting said shank.

11. The combination defined in claim 8 wherein said co-operating means includes a shank on said end fitting and means on said swingboard supporting said shank for axial movement to and from a rotary movement position and for rotary movement relative to said swingboard when in said rotary movement position.

12. The combination defined in claim 11 wherein said co-operating means includes means for holding said shank against substantial rotary movement relative to said swingboard when said shank is out of said rotary movement position.

13. The combination defined in claim 12 including means for both yieldably opposing said axial movement and yieldably opposing said rotary movement when said shank is in said rotary movement position.

14. In a freight bracing apparatus for a railroad freight car or the like having supporting rails mounted on opposite side walls of said car, a freight bracing member adapted to extend between and be supported on a pair of said support rails on opposite side walls of said freight car, said freight bracing member comprising an elongated body member, an end fitting having a shank portion, co-operating means on said body member and said shank portion mounting said end fitting on said body member for movement relative to said body member longitudinally of said shank portion to and from a rotary movement position and for rotary movement relative to said body member about the axis of said shank portion when in said rotary movement position, said last named means including means effective upon movement of said end fitting from said rotary movement position to hold said end fitting in either of two rotative positions relative to said body member and against rotary movement relative to said body member between said two rotative positions.

15. The combination defined in claim 14 including means on said body member yieldably opposing movement of said end fitting longitudinally of said body member.

16. The combination defined in claim 14 wherein said shank portion of said end fitting is offset with respect to the central longitudinal axis of said body member.

17. In a freight bracing apparatus for a railroad freight car or the like including a supporting rail attached to the freight car side wall and having a flange extending in spaced relation to said side wall and having a longitudinally extending supporting surface, a swingboard adapted to engage freight, an end fitting adapted to be connected to said supporting rail, means connecting said end fitting to said swingboard, said end fitting including a hook-shaped portion adapted to be hooked over said flange and engage said supporting surface with the plane of said hook-shaped portion disposed substantially perpendicular to said supporting surface, said hook-shaped portion having a downwardly turned end portion extending between said flange and said side wall when said hook-shaped portion is hooked over said flange, said end fitting also including a projection spaced below said hook-shaped portion and adapted to extend below said flange when the hook-shaped portion is hooked over said flange, said end portion of said hook-shaped portion and said projection having co-operating spaced parallel surfaces inclined relative to the plane of said hook-shaped portion and adapted in one rotative position of said end fitting relative to said supporting rail to receive said flange between said surfaces.

18. In a freight bracing apparatus for a railroad freight car or the like having supporting rails mounted on opposite side walls of said car, a freight bracing member adapted to extend between and be supported on a pair of said support rails on opposite side walls of said freight car, said freight bracing member comprising an elongated body member, an end fitting having a shank portion, co-operating means on said body member and said shank portion mounting said end fitting on said body member for movement relative to said body member longitudinally of said shank portion to and from a rotary movement position and for rotary movement relative to said body member about the axis of said shank portion when in said rotary movement position, said last named means including means effective upon movement of said end fitting from said rotary movement position to hold said end fitting in either of two rotative positions relative to said body member and against rotary movement relative to said body member between said two rotative positions, and means on said body member effective when said end fitting is in said rotary movement position to yieldably oppose said rotary movement.

19. In a freight bracing apparatus for a railroad freight car or the like including a supporting rail attached to the freight car side wall and having a flange extending in spaced relation to said side wall and having a longitudinally extending supporting surface, a swingboard adapted to engage freight, an end fitting adapted to be connected to said supporting rail, means connecting said end fitting to said swingboard, said end fitting including a hook-shaped portion adapted to be hooked over said flange and engage said supporting surface with the plane of said hook-shaped portion disposed substantially perpendicular to said supporting surface, said hook-shaped portion having a downwardly turned end portion extending between said flange and said side wall when said hook-shaped portion is hooked over said flange, said end fitting also including a projection spaced below said hook-shaped portion and adapted to extend below said flange when the hook-shaped portion is hooked over said flange, said end portion of said hook-shaped portion and said projection having co-operating spaced parallel surfaces inclined relative to the plane of said hook-shaped portion and adapted in one rotative position of said end fitting relative to said supporting rail to receive said flange between said surfaces, said projection being laterally offset relative to said hook-shaped portion to provide increased engagement between said end portion of said hook-shaped portion and said flange when said hook-shaped portion is perpendicular to said supporting surface of said supporting rail flange and said projection engages the underside of said flange.

References Cited in the file of this patent
UNITED STATES PATENTS

| | | |
|---|---|---|
| 2,071,802 | Sweeley et al. | Feb. 23, 1937 |
| 2,155,463 | Angell | Apr. 25, 1939 |
| 2,425,875 | Hermann | Aug. 19, 1947 |
| 2,576,425 | Thearle | Nov. 27, 1951 |
| 2,659,319 | Hermann | Nov. 17, 1953 |
| 2,674,207 | Kerbaugh et al. | Apr. 6, 1954 |
| 2,769,404 | Dietrichson | Nov. 6, 1956 |
| 2,834,304 | Chapman et al. | May 13, 1958 |
| 2,891,490 | Elsner | June 23, 1959 |